(12) United States Patent
Tokieda

(10) Patent No.: US 11,839,898 B2
(45) Date of Patent: Dec. 12, 2023

(54) DOUBLE-SIDED COATING DEVICE

(71) Applicant: Panasonic Intellectual Property Management Co., Ltd., Osaka (JP)

(72) Inventor: Daisuke Tokieda, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/796,567

(22) PCT Filed: Jan. 14, 2021

(86) PCT No.: PCT/JP2021/001013
§ 371 (c)(1),
(2) Date: Jul. 29, 2022

(87) PCT Pub. No.: WO2021/153248
PCT Pub. Date: Aug. 5, 2021

(65) Prior Publication Data
US 2023/0052155 A1 Feb. 16, 2023

(30) Foreign Application Priority Data

Jan. 29, 2020 (JP) .................................. 2020-012848

(51) Int. Cl.
*B05C 5/02* (2006.01)
*B05C 9/04* (2006.01)
(Continued)

(52) U.S. Cl.
CPC .............. *B05C 5/0254* (2013.01); *B05C 9/04* (2013.01); *B05C 9/14* (2013.01); *B05C 11/10* (2013.01);
(Continued)

(58) Field of Classification Search
CPC ........... B05C 5/0254; B05C 9/04; B05C 9/14; B05C 11/10; B05C 13/02; B05C 1/0843; H01M 4/04; H01M 4/139
(Continued)

(56) References Cited

U.S. PATENT DOCUMENTS

| | | | | |
|---|---|---|---|---|
| 2012/0103252 A1* | 5/2012 | Watanabe | .......... | B65H 23/0324 118/58 |
| 2012/0204787 A1* | 8/2012 | Nakahata | .............. | B05C 11/025 118/118 |

FOREIGN PATENT DOCUMENTS

JP 2011-143388 A 7/2011

OTHER PUBLICATIONS

KR20120016587, Takao et al, English Translation included, published Feb. 24, 2012 (Year: 2012).*

(Continued)

*Primary Examiner* — Laura Edwards
(74) *Attorney, Agent, or Firm* — Rimon P.C.; Tomoki Tanida

(57) ABSTRACT

A double-sided coating device includes: a conveying mechanism for a base material that includes a first surface and a second surface; a first die that applies a first coating material onto the first surface; and a second die that applies a second coating material onto the second surface. The conveying mechanism includes: a roll that conveys the base material, in which the position at which the base material separates from the circumferential surface is higher than a target coating height of the base material; and a drawing section that draws the base material such as to bring the base material closer to the target coating height.

10 Claims, 6 Drawing Sheets

(51) Int. Cl.
  *B05C 9/14* (2006.01)
  *B05C 11/10* (2006.01)
  *B05C 13/02* (2006.01)
  *H01M 4/04* (2006.01)
  *H01M 4/139* (2010.01)
  *B05C 1/08* (2006.01)

(52) U.S. Cl.
  CPC ............... *B05C 13/02* (2013.01); *H01M 4/04* (2013.01); *H01M 4/139* (2013.01); *B05C 1/0843* (2013.01)

(58) Field of Classification Search
  USPC .......................................................... 118/419
  See application file for complete search history.

(56) References Cited

OTHER PUBLICATIONS

JP2014079708, Hirotsugu, English Abstract only, published May 8, 2014 (Year: 2014).*
JP2017079180, Kitajima et al, English Translation included, published Apr. 27, 2017 (Year: 2017).*
EP International Search Report Opinion issued in corresponding International Application EP21748439, dated Jul. 7, 2023. (Year: 2023).*
Supplemental European Search Report for corresponding International Application EP21748439, dated Jul. 7, 2023. (Year: 2023).*
EP2420325, Tokumoto et al, published Feb. 22, 2012 (Year: 2012).*
JP2014065000, Inoue et al, published Apr. 17, 2014 (Year: 2014).*
International Search Report issued in corresponding International Application No. PCT/JP2021/001013, dated Apr. 6, 2021, with English translation.

* cited by examiner

DOUBLE-SIDED COATING DEVICE

CROSS-REFERENCE TO RELATED APPLICATIONS

This application is the U.S. National Phase under 35 U.S.C. § 371 of International Patent Application No. PCT/JP2021/001013, filed on Jan. 14, 2021, which in turn claims the benefit of Japanese Patent Application No. 2020-012848 filed on Jan. 29, 2020, the entire content of each of which is incorporated herein by reference.

BACKGROUND

Field of the Invention

The present disclosure relates to a double-sided coating device.

Description of the Related Art

In the field of lithium-ion secondary battery manufacturing, for example, a double-sided coating device has been conventionally known to form an electrode active material layer by applying, while conveying a base material such as metal foil by roll-to-roll processing, a coating material that contains an electrode active material to the both surfaces of the base material. For such a double-sided coating device, a structure is known in which a first coating material is applied onto a first surface of a base material and dried, and a second coating material is subsequently applied onto a second surface of the base material and dried. However, this structure requires two drying furnaces and hence makes the entire length larger, which increases the facility cost and the installation space.

Meanwhile, another double-sided coating device has been proposed in which a first coating material is applied onto a first surface of a base material, a second coating material is subsequently applied onto a second surface of the base material, and, thereafter, the first coating material and the second coating material are dried at the same time. With such a double-sided coating device, the first coating material can be applied onto the first surface while the base material is supported at the second surface by a back-up roll. However, when the second coating material is applied onto the second surface, the base material cannot be supported by the back-up roll at the first surface coated with the undried first coating material. Accordingly, the second coating material needs to be applied onto the second surface while the base material is floated in the air.

When the base material is floated in the air, it is difficult to maintain the position and flatness of the base material. Accordingly, the thickness of the second coating material film tends to be uneven. Meanwhile, Patent Literature 1, for example, proposes a thin film coating device in which the tip of a nozzle portion, which discharges a coating material, is brought into contact with a base material being conveyed, so that the coating material is applied while the base material is supported by the nozzle portion.
Patent Literature 1: Japanese Unexamined Patent Application Publication No. 2011-143388

With the abovementioned conventional thin film coating device, the base material is supported by the nozzle portion, so that deflection and vibration of the base material can be suppressed. This enables formation of a coating film with a more uniform thickness. However, the base material being conveyed may rub against the nozzle portion, so that particles may be generated due to the abrasion between the base material and the nozzle portion. The generation of particles may cause degradation in product quality and is hence desirably avoided.

SUMMARY OF THE INVENTION

The present disclosure has been made in view of such a situation, and a purpose thereof is to provide a technology for suppressing deflection and vibration of the base material while also suppressing generation of particles in a double-sided coating device.

One aspect of the present disclosure relates to a double-sided coating device. The device includes: a conveying mechanism that continuously conveys a base material of elongated shape, in which the base material includes a first surface and a second surface located opposite to the first surface; a first die that applies a first coating material onto the first surface; and a second die positioned on the downstream side of the first die in a conveyance direction of the base material to apply a second coating material onto the second surface. The conveying mechanism includes: a roll that is positioned on the upstream side of the second die in the conveyance direction, that conveys the base material while supporting it at the second surface on a circumferential surface of the roll, and that sends out the base material to the downstream side in the conveyance direction such that the first surface coated with the first coating material faces upward and the second surface to which the second coating material has not been applied faces downward, in which the position at which the base material separates from the circumferential surface is higher than a target coating height of the base material at which the second surface is spaced away from the second die by a certain amount; and a drawing section that is positioned between the roll and the second die in the conveyance direction and that draws the base material such as to bring it closer to the target coating height.

Optional combinations of the aforementioned constituting elements, and implementation of the present disclosure in the form of methods, apparatuses, or systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
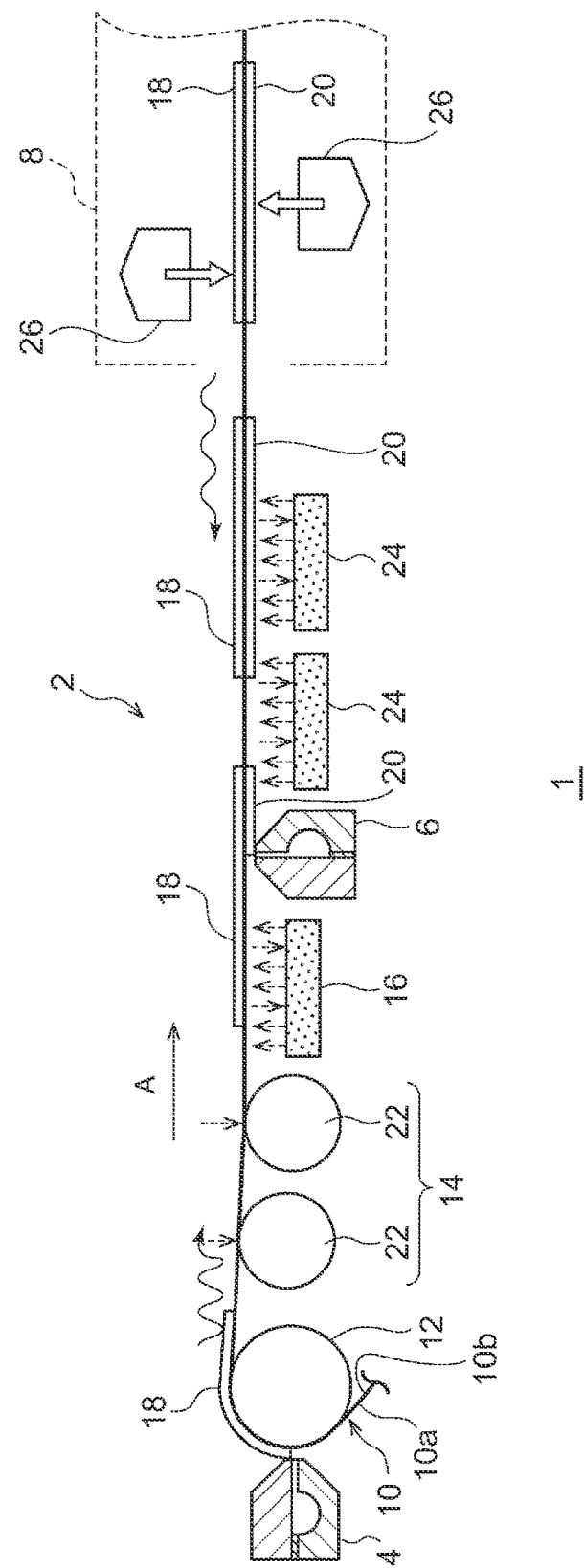
FIG. 1 is a side view that schematically illustrates a double-sided coating device according to a first embodiment.

In the following, the present disclosure will be described based on preferred embodiments with reference to the drawings. The embodiments are intended to be illustrative only and not to limit the present disclosure, so that it should be understood that not all of the features or combinations thereof described in the embodiments are necessarily essential to the present disclosure. Like reference characters denote like or corresponding constituting elements, members, and processes in each drawing, and repetitive description will be omitted as appropriate.

Also, the scale or shape of each component shown in each drawing is defined for the sake of convenience to facilitate the explanation and is not to be regarded as limitative unless otherwise specified. Further, when the terms "first", "second", and the like are used in the present specification or claims, such terms do not imply any order or degree of importance and are used to distinguish one configuration from another, unless otherwise specified. Further, in each drawing, part of members less important in describing embodiments may be omitted.

First Embodiment

Figure 2:
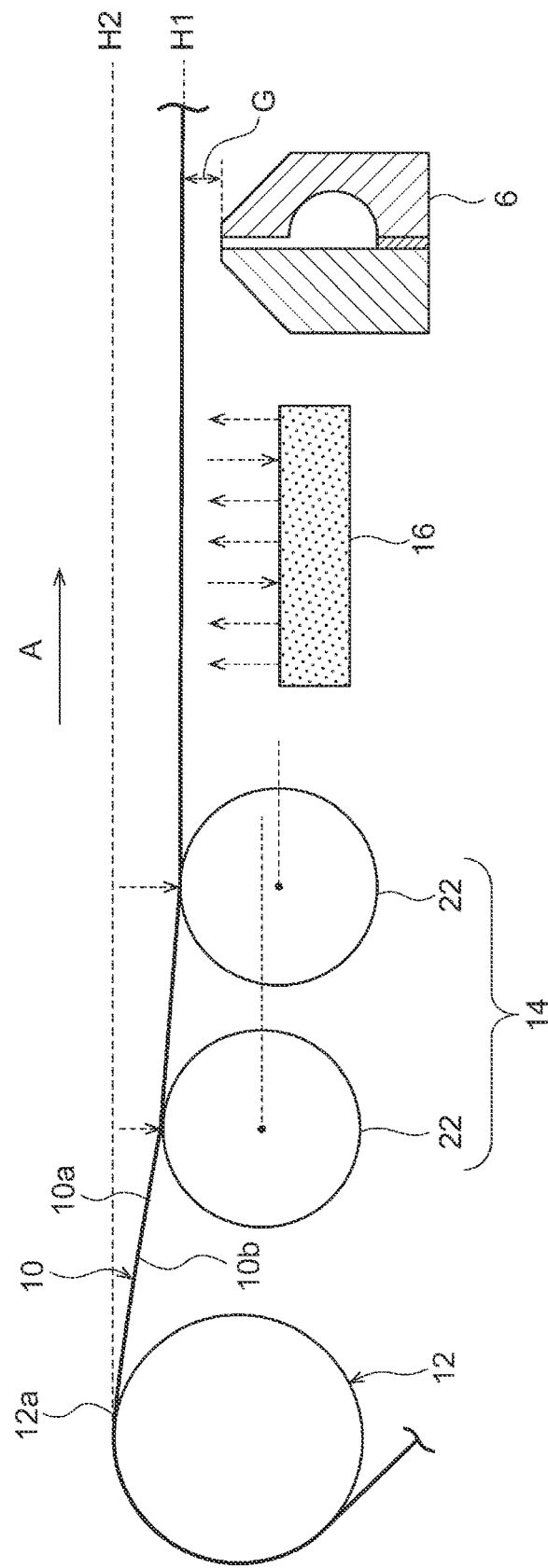
FIG. 2 is a side view of a conveying mechanism partially magnified.

FIG. 1 is a side view that schematically illustrates a double-sided coating device according to the first embodiment. FIG. 2 is a side view of a conveying mechanism 2 partially magnified. A double-sided coating device 1 includes the conveying mechanism 2, a first die 4, a second die 6, and a drying furnace 8. The first die 4, second die 6, and drying furnace 8 are arranged in the enumerated order from the upstream side in a direction A of conveyance of a base material 10 performed by the conveying mechanism 2. Also, the first die 4, second die 6, and drying furnace 8 are arranged in an almost horizontal direction.

The conveying mechanism 2 is a mechanism for continuously conveying the base material 10, which has an elongated lamellar shape. The base material 10 has the form of a wound body and is drawn from the wound body by the conveying mechanism 2. Thereafter, the base material 10 passes through the first die 4, the second die 6, and the drying furnace 8 to be wound around a take-up reel, which is not illustrated. The conveying mechanism 2 includes a roll 12, a drawing section 14, and a supporting part 16. The roll 12 is positioned on the upstream side of the second die 6 in the conveyance direction A of the base material 10 and conveys the base material 10 while supporting it on a circumferential surface of the roll 12. The roll 12 of the present embodiment is disposed such that its circumferential surface faces a discharge port of the first die 4 with a predetermined gap (coating gap) in between, and the roll 12 functions as a back-up roll.

The base material 10 includes a first surface 10a, and a second surface 10b located opposite to the first surface 10a. While the roll 12 supports, on its circumferential surface, the base material 10 at the second surface 10b, the roll 12 conveys the base material 10 such that the base material 10 passes through the gap between the first die 4 and the roll 12. The first die 4 applies a first coating material 18 onto the first surface 10a of the base material 10 passing through the gap between the first die 4 and the roll 12. As an example, the first die 4 may be oriented such that the discharge port thereof faces a horizontal direction and may be aligned horizontally with the roll 12.

The double-sided coating device 1 of the present embodiment is used to manufacture electrode plates of secondary batteries. An electrode plate of a secondary battery is a sheet electrode material obtained by drying a current collector on which electrode slurry is applied. Accordingly, in the present embodiment, the base material 10 is a current collector of a secondary battery, and the first coating material 18 is electrode slurry of a secondary battery. Further, a second coating material 20 discharged from the second die 6 is also electrode slurry of a secondary battery. The current collector may be metal foil, for example. The electrode slurry may be a mixture of a positive-electrode active material or a negative-electrode active material and a solvent, for example. In the case of a general lithium-ion secondary battery, the positive electrode plate is prepared by applying slurry containing a positive-electrode active material, such as lithium cobalt oxide and lithium iron phosphate, onto aluminum foil. Also, the negative electrode plate is prepared by applying slurry containing a negative-electrode active material, such as graphite, onto copper foil. The first coating material 18 and the second coating material 20 may be the same coating material or may be different coating materials. The double-sided coating device 1 may also be used for manufacturing of articles other than electrode plates.

The roll 12 sends out the base material 10 to the downstream side in the conveyance direction A such that the first surface 10a coated with the first coating material 18 faces upward, and the second surface 10b, to which the second coating material 20 has not been applied yet, faces downward. The base material 10 is sent out from the roll 12 in a substantially horizontal direction. The upper end of the circumferential surface of the roll 12 is positioned higher than a target coating height H1 of the base material 10. Also, the height at a position 12a where the base material 10 separates from the circumferential surface of the roll 12, i.e., a sending height H2, is higher than the target coating height H1. The target coating height H1 is a height position at which the second surface 10b is spaced away from the second die 6 by a predetermined amount. When the base material 10 is positioned at the target coating height H1, a predetermined coating gap G is formed between the discharge port of the second die 6 and the second surface 10b. The sending height H2 is almost the same as the height of the upper end of the circumferential surface, but, more strictly, since the base material 10 is drawn downward by the drawing section 14, the sending height H2 is slightly shifted downward from the upper end of the circumferential surface.

Between the roll 12 and the second die 6 in the conveyance direction A of the base material 10, the drawing section 14 is provided. The base material 10 sent out from the roll 12 is drawn by the drawing section 14 to get closer to the target coating height H1. The drawing section 14 includes a suction part 22 that sucks atmospheric gas such as air. With the suction part 22 sucking the second surface 10b, the drawing section 14 can draw the base material 10 downward. The suction part 22 may be constituted by a publicly-known suction roller, adsorption plate, suction-type air knife, or the like. When the drawing section 14 includes multiple suction parts 22 as will be described later, the multiple suction parts 22 may be the same suction mechanism or may be a combination of different suction mechanisms. As an example of a combination of different suction mechanisms, a suction part 22 disposed on the upstream side in the conveyance direction A may be constituted by a suction roller, and a suction part 22 disposed on the downstream side may be constituted by an adsorption plate. The height of each suction part 22 is mechanically adjustable and is adjusted to an optimum height based on the thickness and mass of the base material 10.

The drawing section 14 of the present embodiment includes multiple suction parts 22 arranged along the conveyance direction A of the base material 10. FIGS. 1 and 2 illustrate two suction parts 22 arranged along the conveyance direction A. The multiple suction parts 22 are arranged such that the installation height thereof becomes lower toward the downstream side in the conveyance direction A. More specifically, the suction part 22 on the downstream side in the conveyance direction A is positioned lower than the suction part 22 on the upstream side in the conveyance direction A, i.e., is positioned closer to the target coating height H1. Also, three or more suction parts 22 may be arranged along the conveyance direction A, or only a single suction part 22 may be provided.

The base material 10 is drawn by the drawing section 14 to the target coating height H1 and sent to the downstream side in the conveyance direction A of the base material 10. Between the drawing section 14 and the second die 6 in the conveyance direction A, the supporting part 16 is provided. The base material 10 sent out from the drawing section 14 is supported, at the target coating height H1, by the supporting part 16 and is conveyed to the further downstream side. The height of the supporting part 16 is mechanically adjustable.

The supporting part 16 of the present embodiment is constituted by a floating device that floats the base material 10. As such a floating device, a publicly-known floating plate, air turn bar, or the like may be employed. In the floating device, for example, multiple ejection holes, through which gas such as air is ejected, and multiple suction holes, through which gas (atmospheric gas) is sucked, are provided in a mixed manner. The base material 10 floats while being maintained at a certain height on the floating device by the balance between the positive pressure generated by the gas ejected through the ejection holes and the negative pressure generated by the gas sucked through the suction holes. The supporting part 16 may include multiple floating devices. In this case, in a width direction of the base material 10, i.e., in a direction perpendicular to the conveyance direction A of the base material 10, the floating devices may desirably be arranged at least in a center part and at the both ends of the base material 10.

The supporting part 16 may be a roll similar to the roll 12. However, if the base material 10 is wide (such as 700 mm or wider) and hence the roll also needs to be wide, the diameter of the roll needs to be large in order to make a circumferential surface of the roll flat in a width direction with high accuracy. As the diameter of the roll increases, the position where the supporting part 16 supports the base material 10 is shifted away from the second die 6. If the support position of the base material is shifted away from the second die 6, the base material 10, of which distortion and vibration has been suppressed by the supporting part 16, may become likely to distort or vibrate again at the second die 6. Accordingly, when the base material 10 is wide, the supporting part 16 may preferably be constituted by a floating device. Such a floating device can be easily disposed near the second die 6.

When the base material 10 is small in width, on the other hand, the flatness of the circumferential surface in a width direction can be secured with a roll having a small diameter. In this case, the roll as the supporting part 16 can be disposed near the second die 6. This enables cost reduction of the double-sided coating device 1. Even if the base material 10 comes into contact with the circumferential surface of the roll, since the roll also rotates with the conveyance of the base material 10, the generation of particles can be suppressed. Further, if the drawing section 14 is disposed close enough to the second die 6, the supporting part 16 may be omitted.

On the downstream side of the supporting part 16 in the conveyance direction A of the base material 10, the second die 6 is provided. The second die 6 applies the second coating material 20 onto the second surface 10b of the base material 10 floated in the air. As described previously, the second coating material 20 in the present embodiment is electrode slurry of a secondary battery. As an example, the second die 6 may be oriented such that the discharge port thereof faces vertically upward to apply the second coating material 20 onto the second surface 10b that faces vertically downward.

Between the second die 6 and the drying furnace 8 in the conveyance direction A of the base material 10, a floating device 24 is provided. The floating device 24 may be constituted by a publicly-known floating plate or the like. The base material 10 that has passed through the second die 6 is supported by the floating device 24 without contact and conveyed to the downstream side.

On the downstream side of the floating device 24 in the conveyance direction A of the base material 10, the drying furnace 8 is provided. Inside the drying furnace 8, a gas ejection nozzle 26 is provided on each of the upper and lower sides, through which gas (such as hot air) is ejected to dry the first coating material 18 and the second coating material 20. The base material 10, of which the first surface 10a is coated with the first coating material 18 and the second surface 10b is coated with the second coating material 20, is conveyed within the drying furnace 8 while being floated in the air by the gas ejected from the gas ejection nozzles 26. While passing through the drying furnace 8, the first coating material 18 and the second coating material 20 on the base material 10 are dried, and the base material 10 then leaves the drying furnace 8 to be wound around a take-up reel.

As described above, the double-sided coating device 1 according to the present embodiment includes: the conveying mechanism 2 that continuously conveys the base material 10, which includes the first surface 10a and the second surface 10b; the first die 4 that applies the first coating material 18 onto the first surface 10a; and the second die 6 positioned on the downstream side of the first die 4 in the conveyance direction A of the base material 10 to apply the second coating material 20 onto the second surface 10b. The conveying mechanism 2 includes the roll 12 and the drawing section 14. The roll 12 is positioned on the upstream side of the second die 6 in the conveyance direction A and conveys the base material 10 while supporting it at the second surface 10b on the circumferential surface of the roll 12. Also, the roll 12 sends out the base material 10 to the downstream side in the conveyance direction A such that the first surface 10a coated with the first coating material 18 faces upward and the second surface 10b to which the second coating material has not been applied faces downward. Also, the position 12a of the roll 12 at which the base material 10 separates from the circumferential surface of the roll 12 is higher than the target coating height H1 of the base material 10 at which the second surface 10b is spaced away from the second die 6 by a predetermined amount. The drawing section 14 is positioned between the roll 12 and the second die 6 in the conveyance direction A and draws the base material 10 such as to bring it closer to the target coating height H1.

The base material 10 is supported at one end side by the roll 12 and supported at the other end side by a conveyance roll or a take-up roll, not illustrated, on the downstream side of the drying furnace 8. Accordingly, a portion of the base material 10 between the two rolls can be floated in the air to create a state where the base material has no contact with the second die 6. However, in this case, the portion of the base material 10 between the two rolls will be deflected downward more than slightly by its own weight. The amount of deflection of the base material increases as the distance between the two rolls increases. When the base material 10 deflects, vibration of the base material 10 caused by the rotation of the roll 12 or the hot air from the drying furnace 8, for example, can easily propagate through the base material 10, so that it is difficult to stably maintain the position of the base material 10. In addition, distortion will occur in the base material 10 and hence the flatness thereof will be reduced. In particular, since the thickness of the base material 10 is very small, such as several tens of micrometers or even several micrometers in some cases, ensuring the position and flatness of the deflected base material 10 is difficult in general non-contact conveyance using only a floating plate.

In contrast, by allowing the drawing section 14 to draw the base material 10 downward by the amount of deflection, the base material 10 can be strained with certain tension, so that distortion and vibration of the base material 10 can be suppressed. Accordingly, with the double-sided coating device 1 of the present embodiment, deflection and vibration of the base material 10 can be suppressed while generation of particles caused by contact between the base material 10 and the second die 6 is also suppressed. This avoids degradation in product quality due to particles. Also, since the flatness of the base material floating in the air can be improved, the coating film of the second coating material 20 can be formed more accurately.

The conveying mechanism 2 of the present embodiment also includes the supporting part 16. The supporting part 16 is positioned between the drawing section 14 and the second die 6 in the conveyance direction A and supports the base material 10, which has been drawn to the target coating height H1 by the drawing section 14, at the target coating height H1. Since the supporting part 16 positioned on the downstream side of the drawing section 14 supports the base material 10, the distortion of the base material 10 can be further corrected. As an example, the drawing section 14 corrects the distortion of the base material 10 on the order of millimeters, and the supporting part 16 corrects the distortion of the base material 10 on the order of micrometers. Also, with the supporting part 16, the vibration of the base material 10 can be further suppressed.

Also, the supporting part 16 of the present embodiment is constituted by a floating device that floats the base material 10. Accordingly, even when the base material 10 is wide, the supporting part 16 can be disposed near the second die 6. Therefore, the flatness of the base material 10 passing above the second die 6 can be maintained more easily.

Also, the drawing section 14 of the present embodiment includes multiple suction parts 22 arranged along the conveyance direction A of the base material 10 to suck the second surface 10b. The multiple suction parts 22 are arranged such that the installation height thereof becomes lower toward the downstream side in the conveyance direction A. Accordingly, the base material 10 at the sending height H2 can be drawn in stages to be lowered to the target coating height H1. By drawing the base material 10 in stages, the suction force required for one suction part 22 can be reduced. Also, a situation can be prevented in which excessive load is applied on the base material 10 due to the suction.

The double-sided coating device 1 also includes the drying furnace 8 positioned on the downstream side of the second die 6 in the conveyance direction A of the base material 10, and the floating device 24 positioned between the second die 6 and the drying furnace 8 in the conveyance direction A. With the floating device 24 provided between the second die 6 and the drying furnace 8, a situation can be prevented in which the vibration of the base material 10 caused by exposure to hot air in the drying furnace 8 propagates to the upstream side of the floating device 24. Therefore, the flatness of the base material 10 passing above the second die 6 can be maintained more easily.

Second Embodiment

Figure 3:
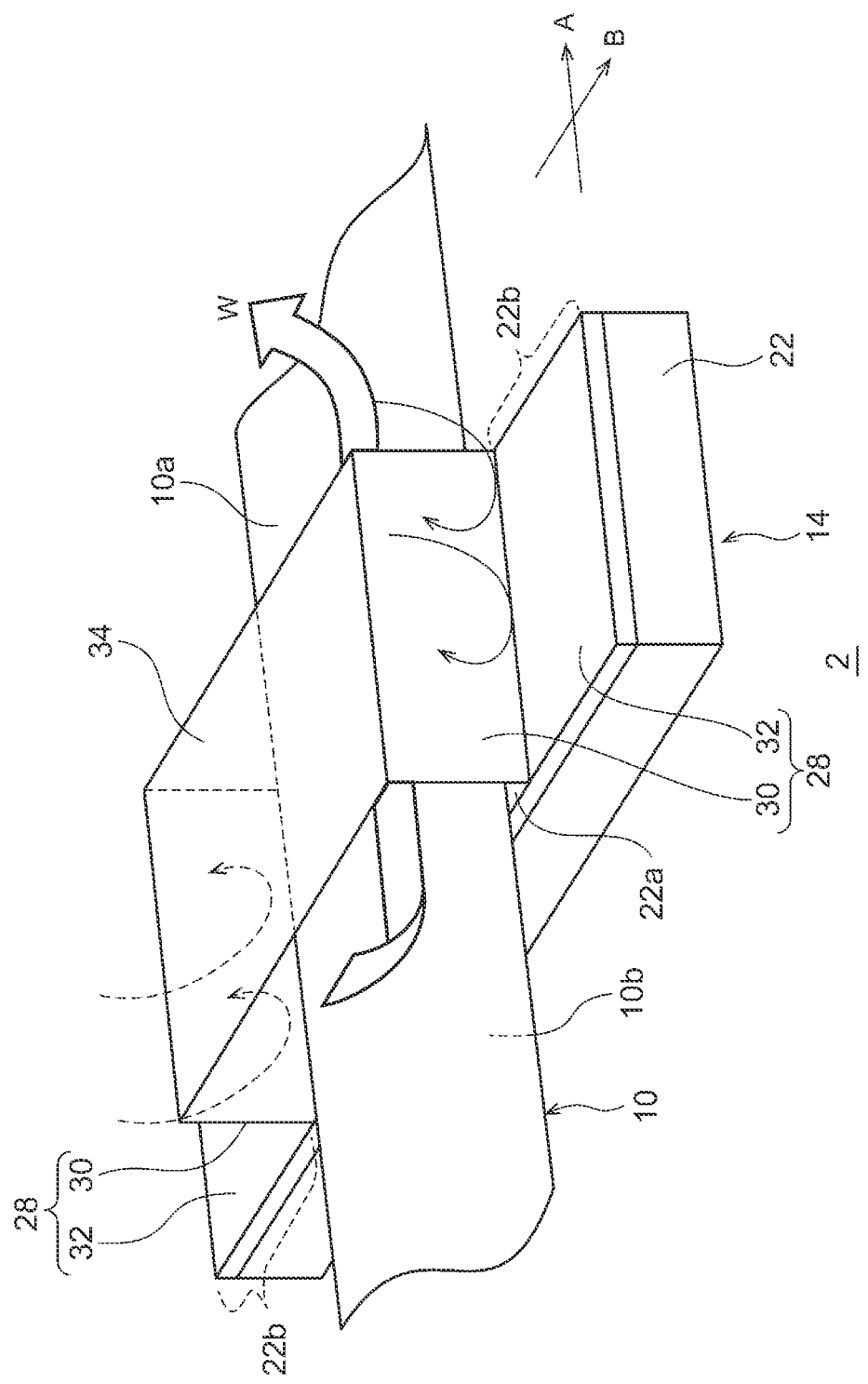
FIG. 3 is a perspective view of part of the conveying mechanism provided in the double-sided coating device according to a second embodiment.

The second embodiment includes a configuration basically in common with the first embodiment, except that the conveying mechanism 2 includes flow regulating members. In the following, the present embodiment will be described mainly for configurations different from those in the first embodiment, and description of configurations in common will be briefly given or may be omitted. FIG. 3 is a perspective view of part of the conveying mechanism 2 provided in the double-sided coating device 1 according to the second embodiment.

As illustrated in FIG. 3, the drawing section 14 includes a suction part 22 that sucks atmospheric gas such as air. The suction part 22 faces the second surface 10b of the base material 10 to suck the second surface 10b. Accordingly, the base material 10 is drawn downward. The suction part 22 of the present embodiment is constituted by an adsorption plate, as an example, which includes a suction surface 22a extending parallel with the second surface 10b. By sucking atmospheric gas through the suction surface 22a, the suction part 22 can draw the base material 10.

Also, the conveying mechanism 2 of the present embodiment includes a pair of flow regulating members 28. The pair of flow regulating members 28 are arranged on the both sides in a width direction B of the base material 10, which is perpendicular to the conveyance direction A. The pair of flow regulating members 28 each regulate the entry of atmosphere between the suction part 22 and the second surface 10b, at an end of the base material 10 (an end with respect to the width direction B). Each flow regulating member 28 of the present embodiment includes a side plate 30 extending upward on the suction part 22. Each side plate 30 extends, on the suction surface 22a and on the outside of the base material 10 with respect to the width direction B, in a direction that intersects the suction surface 22a. As an example, the side plate 30 may be rectangular in shape, and the lower side thereof may be in contact with the suction surface 22a of side plate 30 suction part 22. Near an end of the base material 10, the side plate 30 covers the gap between the suction surface 22a and the second surface 10b when viewed from the width direction B.

When the suction part 22 sucks atmospheric gas, the outside atmosphere is likely to flow into the gap between the suction part 22 and the base material 10, at an end with respect to the width direction B of the base material 10. Accordingly, at an end of the base material 10, the suction force of the suction part 22 is spent to suck the outside atmosphere, so that the drawn amount of the base material 10 at the end tends to be smaller than that in a center part of the base material 10. In contrast, by placing the flow regulating members 28 on the both sides in the width direction B of the base material 10, entry of the outside atmosphere into the gap between the suction part 22 and the base material 10 can be regulated, so that the drawn amount at the ends of the base material 10 can be increased. Accordingly, the base material 10 can be drawn more uniformly along the width direction B. Therefore, deflection of the base material 10 can be further suppressed.

Also, each flow regulating member 28 blocks, with the side plate 30 disposed on the suction part 22, the entry of atmosphere into the gap between the suction part 22 and the base material 10. The side plate 30 is placed on the suction part 22 and hence can easily be placed near the base material 10. Therefore, the entry of atmosphere into the gap between the suction part 22 and the base material 10 can be further regulated, so that the deflection of the base material 10 can also be further suppressed.

Also, the suction part 22 of the present embodiment includes outer edge regions 22b that extend on the outside of the base material 10 with respect to the width direction B. Meanwhile, each flow regulating member 28 includes a support plate 32. Each support plate 32 covers the corresponding outer edge region 22b and is connected to the corresponding side plate 30. Each support plate 32 preferably covers the entirety of the corresponding outer edge region 22b; however, structure is not limited thereto and each support plate 32 may have only to cover at least part of the corresponding outer edge region 22b. As an example, each support plate 32 may be rectangular in shape, and the side thereof positioned on the center side of the base material 10 with respect to the width direction B and extending in the conveyance direction A may be connected to the lower side of the corresponding side plate 30.

With the support plates 32 covering the outer edge regions 22b, the flow regulating members 28 can be fixed by means of the suction force of the suction part 22. Accordingly, since a fixing mechanism for the flow regulating members 28 need not be provided separately, complication of the structure of the double-sided coating device 1 caused by the installation of the flow regulating members 28 can be reduced. Also, even if the suction part 22 includes a porous body and a vacuum pump and is configured such that the porous body sucks atmospheric gas by means of the driving of the vacuum pump, for example, since the outer edge regions 22b are covered with the support plates 32, the openings of the porous body in the outer edge regions 22b can also be covered. Accordingly, the suction force of the suction part 22 can be concentrated on the base material 10. As a result, the deflection and vibration of the base material 10 can be further suppressed.

The conveying mechanism 2 of the present embodiment also includes a top plate 34. The top plate 34 is disposed to face the first surface 10a of the base material 10. Accordingly, the base material 10 is positioned between the top plate 34 and the suction part 22. Also, the top plate 34 extends in the width direction B to connect the pair of side plates 30. In other words, the top plate 34 is supported by the pair of side plates 30. As an example, the top plate 34 may be rectangular in shape, and the sides thereof extending in the conveyance direction A at the both ends of the width direction B are connected respectively to the upper sides of the side plates 30. With the top plate 34 extending above the base material 10, the entry of the outside atmosphere into the gap between the suction part 22 and the base material 10 can be further regulated. Therefore, the deflection of the base material can be further suppressed. Also, since the top plate 34 extends above the base material 10, an airflow W flowing between the first surface 10a and the top plate 34 is likely to occur. The airflow W flows between the top plate 34 and the first surface 10a along the first surface 10a. This can suppress the vibration of the base material 10. The airflow W may flow from the upstream side toward the downstream side in the conveyance direction A or may flow from the downstream side toward the upstream side.

Embodiments of the present disclosure have been described in detail. Each of the abovementioned embodiments merely describes a specific example for carrying out the present disclosure. The embodiments are not intended to limit the technical scope of the present disclosure, and various design modifications, including changes, addition, and deletion of constituting elements, may be made to the embodiments without departing from the scope of ideas of the present disclosure defined in the claims. Such an additional embodiment with a design modification added has the effect of each of the combined embodiments and modifications. In the aforementioned embodiments, matters to which design modifications may be made are emphasized with the expression of "of the present embodiment", "in the present embodiment", or the like. However, design modifications may also be made to matters without such expression. Optional combinations of constituting elements included in each embodiment may also be employed as additional aspects of the present disclosure. Also, the hatching provided on the cross sections in the drawings does not limit the materials of the objects with the hatching.

For the first and second embodiments, first and second modifications as described below can be considered.

First Modification

Figure 4:
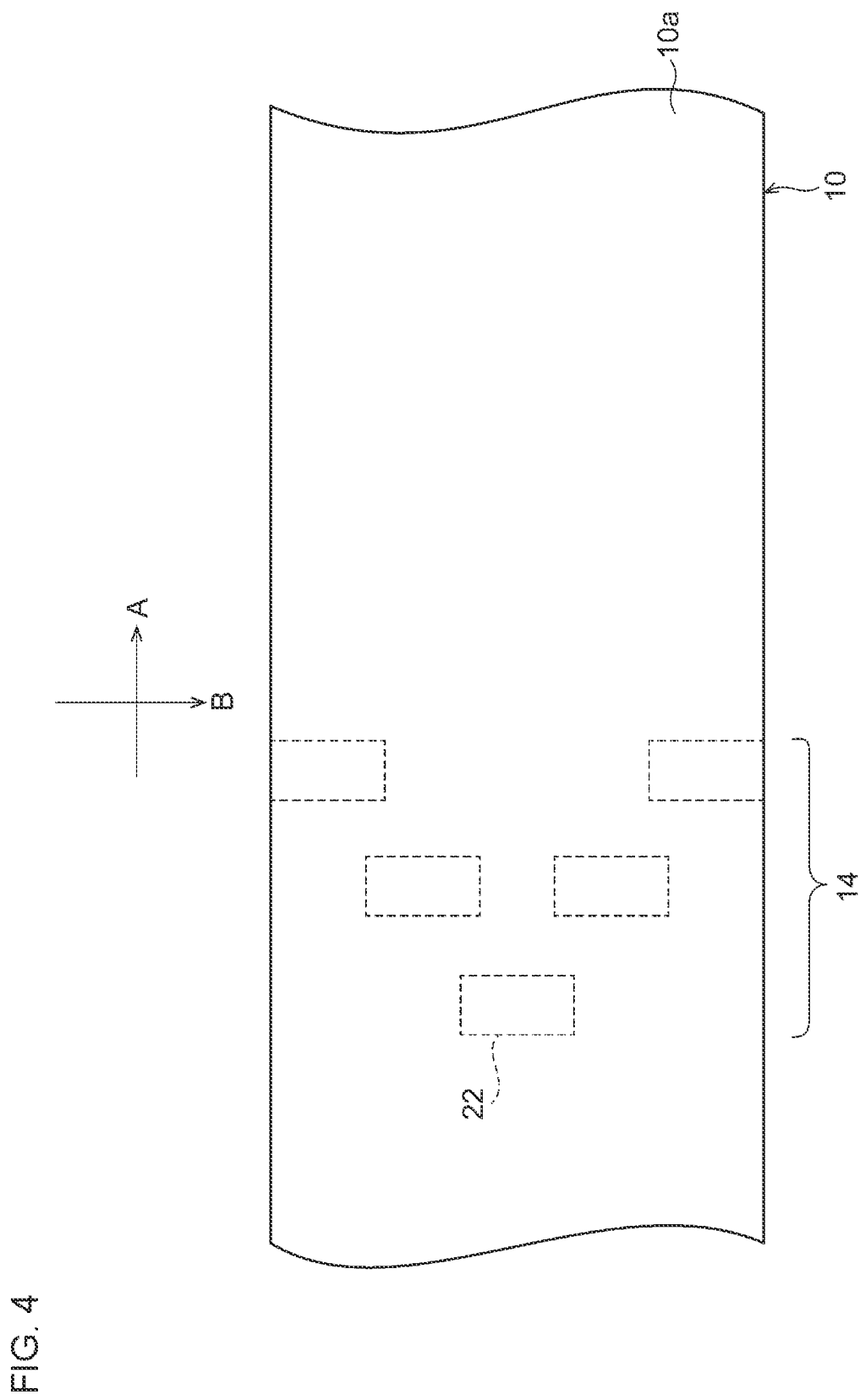
FIG. 4 is a plan view that schematically illustrates a drawing section of the double-sided coating device according to a first modification.

FIG. 4 is a plan view that schematically illustrates the drawing section 14 of the double-sided coating device 1 according to the first modification. The drawing section 14 provided in the double-sided coating device 1 according to the present modification includes multiple suction parts 22 arranged along the conveyance direction A of the base material 10 to suck the second surface 10b. The multiple suction parts 22 are arranged such as to extend from a center part to the both ends with respect to the width direction B of the base material 10, toward the downstream side in the conveyance direction A. For example, the most upstream suction part 22 in the conveyance direction A is disposed in the center part in the width direction B. On the downstream side thereof, two suction parts 22 are arranged such as to be shifted from the most upstream suction part 22 outward on the both sides of the width direction B. Further, on the downstream side thereof, other two suction parts 22 are arranged such as to be shifted further outward on the both sides. Therefore, the positions at which base material 10 is sucked gradually spread from the center side to the both end sides of the width direction B, toward the downstream side in the conveyance direction A.

With such arrangement of the suction parts 22, after the center part in the width direction B of the base material 10 is sucked and tension is applied to the center part, the both ends in the width direction B of the base material 10 can be sucked to apply tension to the both ends. As a result, compared to the case where the entirety in the width direction B of the base material 10 is sucked simultaneously, occurrence of creases or air accumulation in the base material 10 can be suppressed, so that the flatness of the base material 10 can be further improved. Also, on the downstream side, the center part may also be sucked in addition to the both ends of the base material 10. In other words, the width across which the base material 10 is sucked may be gradually increased from the center, toward the downstream side in the conveyance direction A.

The drawing section 14 may have drawing force corresponding to the amount of deflection of the base material 10 in the width direction B of the base material 10. For example, the base material 10 tends to deflect more at the both ends than in the center part. Accordingly, greater suction force may be set to the suction parts 22 that suck the both ends of the base material 10, compared to the suction part 22 that sucks the center part of the base material 10. This can make the base material 10 flatter. When multiple suction parts 22 are constituted by porous bodies, the multiple suction parts 22 may be constituted by multiple regions in a single porous body or may be constituted by multiple porous bodies independent of each other.

Second Modification

Figure 5:
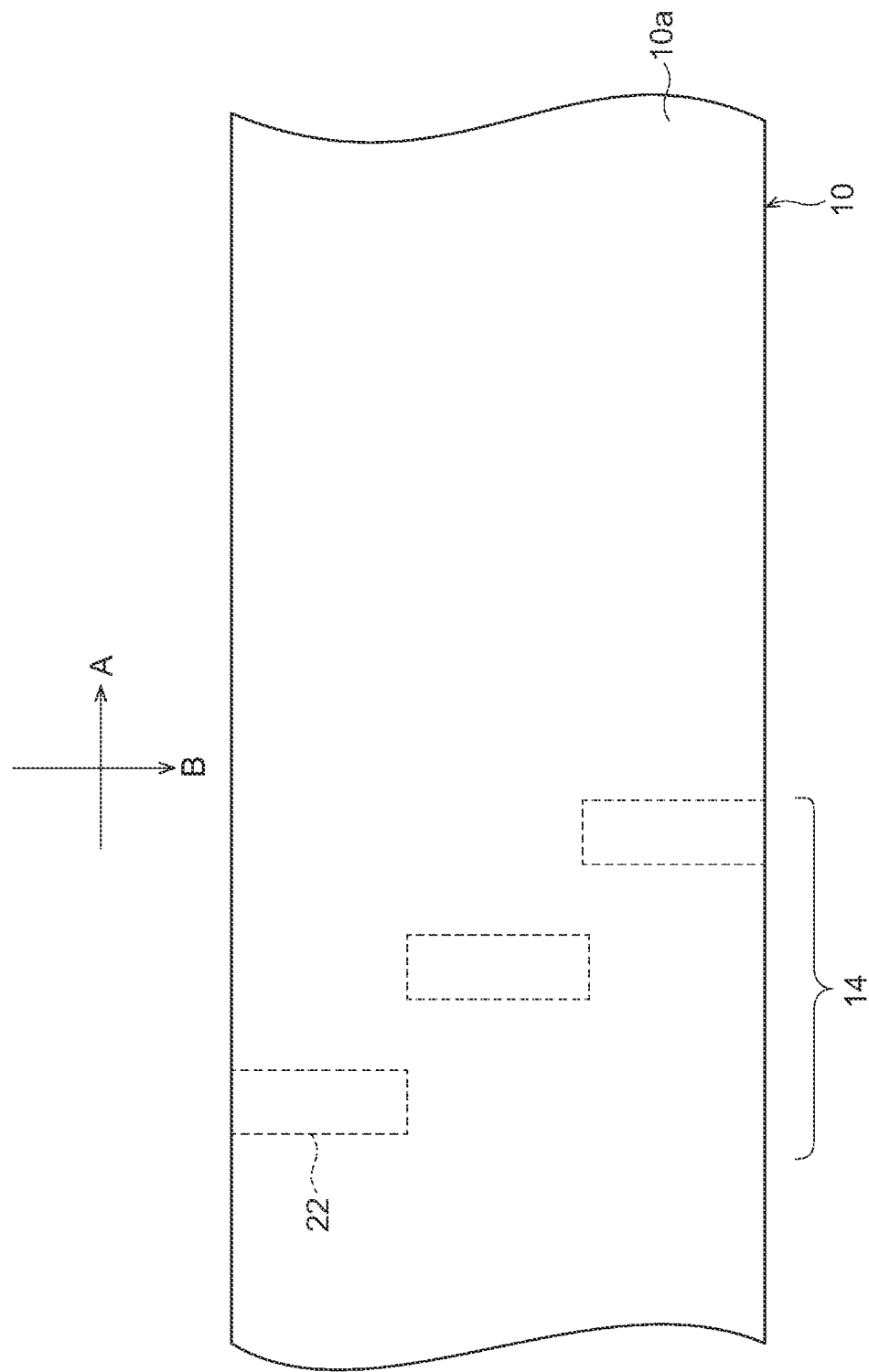
FIG. 5 is a plan view that schematically illustrates the drawing section of the double-sided coating device according to a second modification.

FIG. 5 is a plan view that schematically illustrates the drawing section 14 of the double-sided coating device 1 according to the second modification. The drawing section 14 provided in the double-sided coating device 1 according to the present modification includes multiple suction parts 22 arranged along the conveyance direction A of the base material 10 to suck the second surface 10b. The multiple suction parts 22 are arranged such as to extend from one end side to the other end side of the base material 10 with respect to the width direction B, toward the downstream side in the conveyance direction A of the base material 10. Accordingly, a suction part 22 on the downstream side in the conveyance direction A is disposed closer to the other end side of the base material 10 with respect to the width direction B than a suction part 22 on the upstream side. Therefore, the position at which base material 10 is sucked gradually shifts from one end side to the other end side of the width direction B, toward the downstream side in the conveyance direction A.

Also with such arrangement of the suction parts 22, occurrence of creases or air accumulation in the base material 10 can be suppressed, so that the flatness of the base material 10 can be further improved, as is the case in the first modification. Also, on the downstream side, the one end side may also be sucked in addition to the other end side of the base material 10. In other words, the width across which the base material 10 is sucked may be gradually increased from the one end side, toward the downstream side in the conveyance direction A. Also, as is the case in the first modification, the drawing force of the drawing section 14 may be changed according to the amount of deflection of the base material 10. Also, the multiple suction parts 22 may be constituted by multiple regions in a single porous body or may be constituted by multiple porous bodies independent of each other.

For the second embodiment, the following third modification can also be considered.

Third Modification

Figure 6:
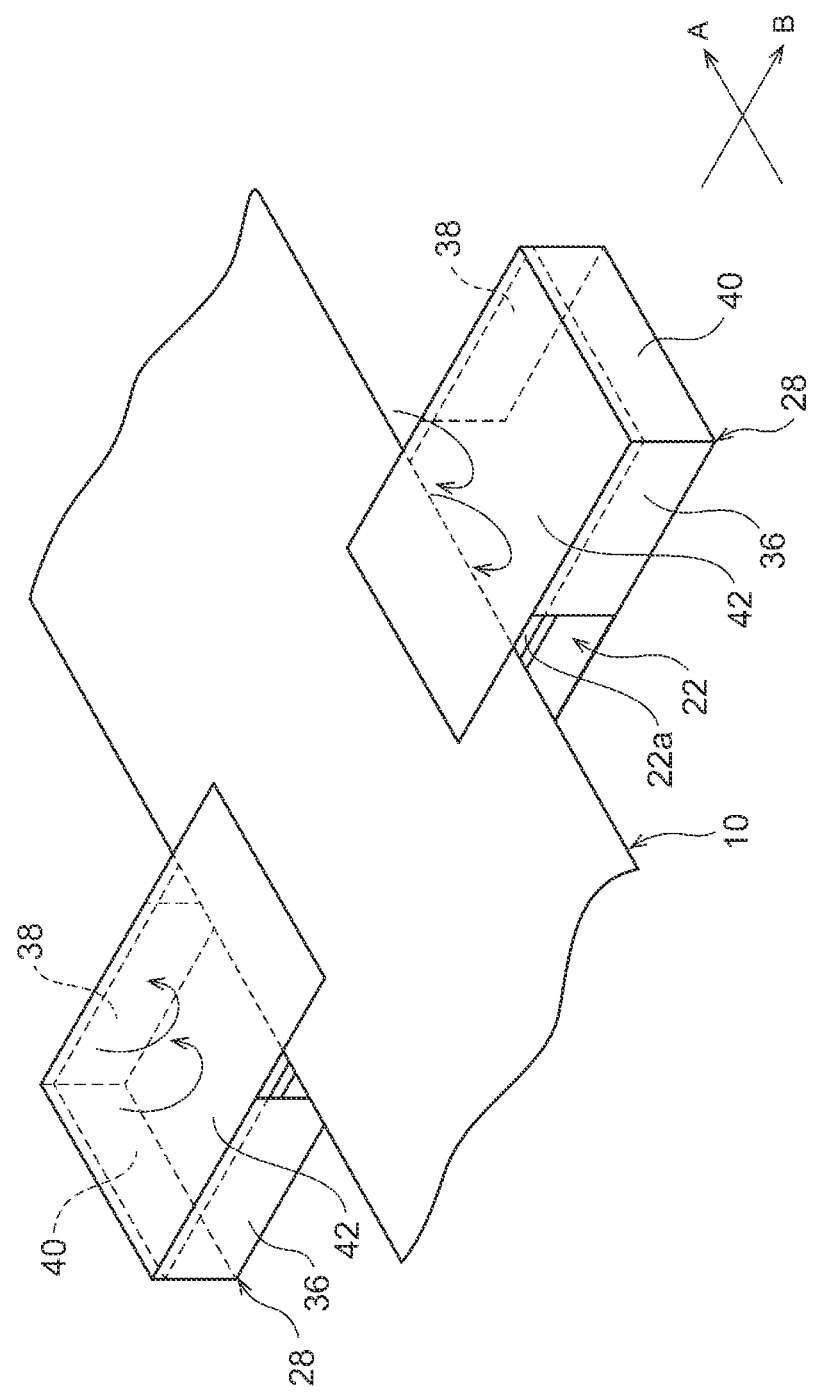
FIG. 6 is a perspective view of part of the conveying mechanism provided in the double-sided coating device according to a third modification.

FIG. 6 is a perspective view of part of the conveying mechanism 2 provided in the double-sided coating device 1 according to the third modification. Each flow regulating member 28 provided in the double-sided coating device 1 according to the present modification has a substantial box shape that houses an end with respect to the width direction B of the suction part 22. Each flow regulating member 28 includes at least a first plate 36, a second plate 38, a third plate 40, and a fourth plate 42. As an example, each of the plates may be rectangular in shape. An end with respect to the width direction B of the suction part 22 projects outward of the base material 10. With respect to this end, the first plate 36 is disposed on the upstream side in the conveyance direction A, the second plate 38 is disposed on the downstream side in the conveyance direction A, the third plate 40 is disposed on the outside with respect to the width direction B, and the fourth plate 42 is disposed on the upper side at a distance.

The first plate 36 and the second plate 38 sandwich, in the conveyance direction A, the end of the suction part 22. The third plate 40 covers a surface of the suction part 22 facing the width direction B and connects the first plate 36 and the second plate 38. Also, the upper side of each of the first plate 36, second plate 38, and third plate 40 is positioned above the suction surface 22a and connected to the fourth plate 42. The fourth plate 42 covers the end of the suction part 22. Also, the fourth plate 42 extends to the base material 10 side and covers an end with respect to the width direction B of the base material 10. Accordingly, the fourth plate 42 covers the gap between the suction surface 22a and the second surface 10b when viewed from the above. Also with such a configuration, the entry of the outside atmosphere into the gap between the suction part 22 and the base material 10 can be regulated, so that the base material 10 can be drawn more uniformly along the width direction B. Therefore, the deflection of the base material 10 can be further suppressed. Although the pair of fourth plates 42 are discontinuous from each other, the structure is not limited thereto and the fourth plates 42 may be connected to each other to form the top plate 34.

Each of the technical ideas described in the first and second embodiments and the first through third modifications may be arbitrarily combined, as long as they do not contradict each other.

The invention claimed is:

1. A double-sided coating device, comprising:
a conveying mechanism that continuously conveys a base material of elongated shape, the base material including a first surface and a second surface located opposite to the first surface;
a first die that applies a first coating material onto the first surface; and
a second die positioned on the downstream side of the first die in a conveyance direction of the base material to apply a second coating material onto the second surface,
the conveying mechanism comprising:
a roll that is positioned on an upstream side of the second die in the conveyance direction, that conveys the base material while supporting it at the second surface on a circumferential surface of the roll, and that sends out the base material to the downstream side in the conveyance direction such that the first surface coated with the first coating material faces upward whereas the second surface to which the second coating material has not been applied faces downward, a position at which the base material separates from the circumferential surface being higher than a target coating height of the base material at which the second surface is spaced away from the second die by a predetermined amount; and
a drawing section that is positioned between the roll and the second die in the conveyance direction and that draws the base material such as to bring it closer to the target coating height wherein the drawing section comprises a suction part facing the second surface to suck the second surface, and the conveying mechanism comprises a pair of flow regulating members arranged on the both sides of the base material with respect to a width direction of the base material to regulate entry of atmosphere between the suction part and the second surface at an end of the base material.

2. The double-sided coating device according to claim 1, wherein the conveying mechanism comprises a supporting part that is positioned between the drawing section and the second die in the conveyance direction and that supports the base material at the target coating height.

3. The double-sided coating device according to claim 2, wherein the supporting part is constituted by a floating device that floats the base material.

4. The double-sided coating device according to claim 1, wherein
the drawing section comprises a plurality of suction parts arranged along the conveyance direction to suck the second surface, and
the plurality of suction parts are arranged such that the installation height thereof becomes lower toward the downstream side in the conveyance direction.

5. The double-sided coating device according to claim 1, wherein
the drawing section comprises a plurality of suction parts arranged along the conveyance direction to suck the second surface, and
the plurality of suction parts are arranged such as to extend from a center part to the both ends with respect to a width direction of the base material toward the downstream side in the conveyance direction or such as to extend from one end side to the other end side of the width direction toward the downstream side in the conveyance direction.

6. The double-sided coating device according to claim 1, wherein the drawing section has drawing force corresponding to the amount of deflection of the base material in a width direction of the base material.

7. The double-sided coating device according to claim 1, wherein each flow regulating member includes a side plate extending upward on the suction part.

8. The double-sided coating device according to claim 7, wherein
the suction part includes an outer edge region extending on the outside of the base material with respect to the width direction, and
each flow regulating member includes a support plate that covers the outer edge region and is connected to the side plate.

9. The double-sided coating device according to claim 7, wherein the conveying mechanism includes a top plate disposed to face the first surface and connect a pair of the side plates.

10. The double-sided coating device according to claim 1, further comprising:
a drying furnace positioned on the downstream side of the second die in the conveyance direction; and
a floating device positioned between the second die and the drying furnace in the conveyance direction.

\* \* \* \* \*